(12) United States Patent
Zhang (10) Patent No.: US 12,341,358 B2
(45) Date of Patent: Jun. 24, 2025

(54) ANGLE SELF-ADJUSTING WIRELESS CHARGING DEVICE

(71) Applicant: Shenzhen Jinmeiyi Technology Co., Ltd, Shenzhen (CN)

(72) Inventor: Weisheng Zhang, Shenzhen (CN)

( * ) Notice: Subject to any disclaimer, the term of this patent is extended or adjusted under 35 U.S.C. 154(b) by 0 days.

(21) Appl. No.: 19/015,944

(22) Filed: Jan. 10, 2025

(65) Prior Publication Data

US 2025/0149929 A1    May 8, 2025

(30) Foreign Application Priority Data

Sep. 13, 2024  (CN) .......................... 202422242870.1

(51) Int. Cl.
*H02J 50/00* (2016.01)
*H02J 50/90* (2016.01)

(52) U.S. Cl.
CPC ............ *H02J 50/90* (2016.02); *H02J 50/005* (2020.01)

(58) Field of Classification Search
CPC .................................................. H02J 50/005
USPC ................................................. 320/108, 115
See application file for complete search history.

(56) References Cited

U.S. PATENT DOCUMENTS

| | | | |
|---|---|---|---|
| 9,343,837 B2 * | 5/2016 | Moon .................... | H02J 7/0044 |
| 2018/0011551 A1 * | 1/2018 | Gothlin .................. | B60K 35/10 |
| 2024/0178682 A1 * | 5/2024 | Wu ......................... | H02J 50/90 |
| 2024/0322608 A1 * | 9/2024 | Li .......................... | H02J 50/005 |

* cited by examiner

*Primary Examiner* — Drew A Dunn
*Assistant Examiner* — Ahmed H Omar
(74) *Attorney, Agent, or Firm* — Daniel M. Cohn; Howard M. Cohn (57) ABSTRACT

The utility model discloses an angle self-adjusting wireless charging device, which comprises a main body shell and a first wireless charging device arranged at the upper end of the main body shell, the first wireless charging device is vertically and rotationally connected with the main body shell and driven by a first motor, a panel turntable which can rotate horizontally is arranged on the first wireless charging device and driven by a second motor, and the first motor and the second motor are connected with a mainboard located in the main body shell. A control signal generated after power-on is transmitted to the first motor or the second motor to drive the first wireless charging device to rotate vertically or horizontally, or the first motor and the second motor are controlled by buttons to drive the first wireless charging device to rotate vertically or horizontally.

1 Claim, 12 Drawing Sheets

ANGLE SELF-ADJUSTING WIRELESS CHARGING DEVICE

TECHNICAL FIELD

The utility model relates to the technical field of chargers, in particular to an angle self-adjusting wireless charging device.

BACKGROUND ART

The charging module of the wireless charging device can be manually adjusted to a certain angle, and the adjusted angle is limited, and it is necessary to adjust manually. If the wireless charging device is a vehicle wireless charging device, the user has no time to adjust manually in the driving process.

The Chinese utility model patent with publication number CN214176958U discloses a self-rotating vehicle wireless charger, upper, lower, left and right control buttons are arranged on a control key, the four control buttons correspond to the angle adjustment in four directions, facilitating the personnel to realize the angle adjustment of the charging panel through the control key in the driving process and then realize the angle adjustment of the mobile phone.

The driver is easily distracted in the case of manual adjustment in the driving process, which does not meet the requirements for safe driving. In the daily use, manual angle adjustment is complicated, and the user experience is not good.

SUMMARY OF THE UTILITY MODEL

In order to solve the technical problems in the prior art, the utility model proposes an angle self-adjusting wireless charging device The utility model adopts the following technical proposal: an angle self-adjusting wireless charging device comprises a main body shell and a first wireless charging device arranged at the upper end of the main body shell, the first wireless charging device is vertically and rotationally connected with the main body shell and driven by a first motor, a panel turntable which can rotate horizontally is arranged on the first wireless charging device and driven by a second motor, and the first motor and the second motor are connected with a mainboard located in the main body shell.

Further, a rotating part is arranged at the bottom of the first wireless charging device, a shaft hole at the center of the rotating part is connected with the main body shell through a rotating shaft, and a large gear is arranged on the rotating part and is connected with a revolving gear located at the first motor in a transmission mode.

Further, the large gear is a sprocket.

Further, a support bracket is arranged at the top of the main body shell to fit and support the first wireless charging device.

Further, the first wireless charging device comprises a panel, on which a panel turntable and a lower turntable support fit with the panel turntable are arranged, the lower turntable support is connected with a second motor, and the rotating shaft of the second motor passes through a circular hole in the center of the lower turntable support, and the lower turntable support is fixed on the rotating shaft of the second motor.

Further, a plurality of positioning columns are arranged on the panel turntable, corresponding limit slots are arranged on the panel, and the positioning columns slide back and forth along the limit slot.

Further, the number of positioning columns is consistent with the number of limit slots.

Further, a panel bottom shell is fixed at the lower part of the panel and is provided with a cavity for accommodating and fixing the second motor.

Further, the wireless charging device also comprises a coil and a ring magnet, which are arranged in a space enclosed by the lower panel support, the panel and the panel turntable.

Compared with the prior art, the utility model provides an angle self-adjusting wireless charging device, which has the following beneficial effects: a control signal generated after power-on is transmitted to the first motor or the second motor to drive the first wireless charging device to rotate vertically or horizontally, or the first motor and the second motor are controlled by buttons to drive the first wireless charging device to rotate vertically or horizontally.

BRIEF DESCRIPTION OF THE DRAWINGS

To more clearly describe the technical proposal in the embodiment of the utility model, the drawings to be used in the embodiment or the description of the prior art are briefly introduced below. Obviously, the drawings described below are only some embodiments of the utility model. Ordinary technicians in the field may also obtain other drawings based on these drawings without creative labor.

REFERENCE SIGNS panel 1; panel turntable 2; coil 3; ring magnet 4; lower turntable support 5; second motor 6; panel bottom shell 7; first motor 8; support bracket 9; revolving gear 10; rotating part 11; baffle plate 12; rotating shaft 13; main body shell 18; shaft hole 21; large gear 22; positioning column 23; limit slot 24; base 34; mainboard 35; cooling fan 36; base guard plate 37; silicone pad 38; first wireless charging device 100; second wireless charging device 200; third wireless charging device 300.

Detailed Description of the Utility Model

To make the technical problems to be solved by the utility model, the technical proposal and the beneficial effects clearer, the utility model is further described in detail in combination with the drawings and embodiments. Understandably, the embodiments described herein are only intended to explain the utility model and are not intended to limit the utility model.

The principle and structure of the utility model are described in detail in combination with the drawings and embodiments.

More and more electronic devices are needed in work and life, some of which have wireless charging functions, such as mobile phones, watches and Bluetooth headsets. However, the existing wireless chargers are generally fixed or can be rotated by button control. The control mode is complicated, especially for the vehicle wireless charging devices. The driver is distracted by controlling through keys.

As shown in FIG. 1 to FIG. 4, the utility model provides an angle self-adjusting wireless charging device, which comprises a main body shell 18, a first wireless charging device 100 is arranged at the upper end of the main body shell 18, is vertically and rotationally connected with the main body shell 18 and is driven by a first motor 8, a panel device 200 which can rotate horizontally is arranged on the first wireless charging device 100 and is driven by a second motor 6, and the first motor 8 and the second motor 6 are connected with a mainboard 35 located in the main body shell.

Figure 1:
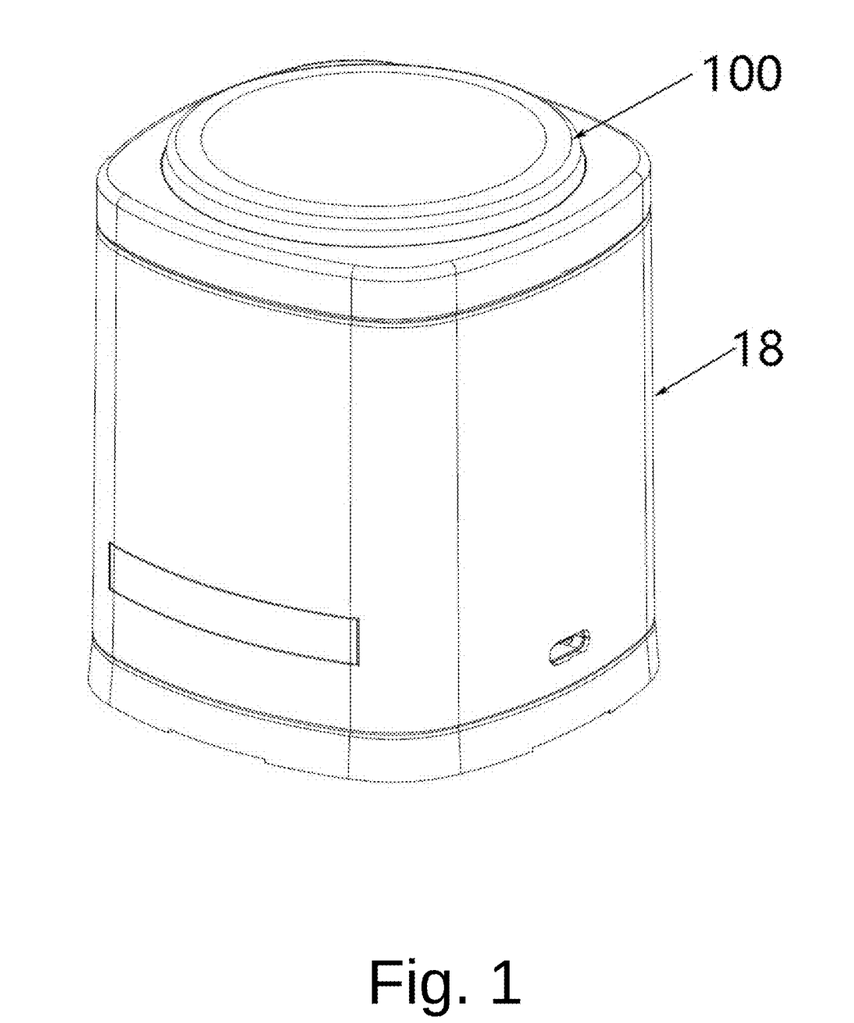
FIG. 1 is the structural diagram of a wireless charging device in the embodiment of the utility model.
Figure 2:
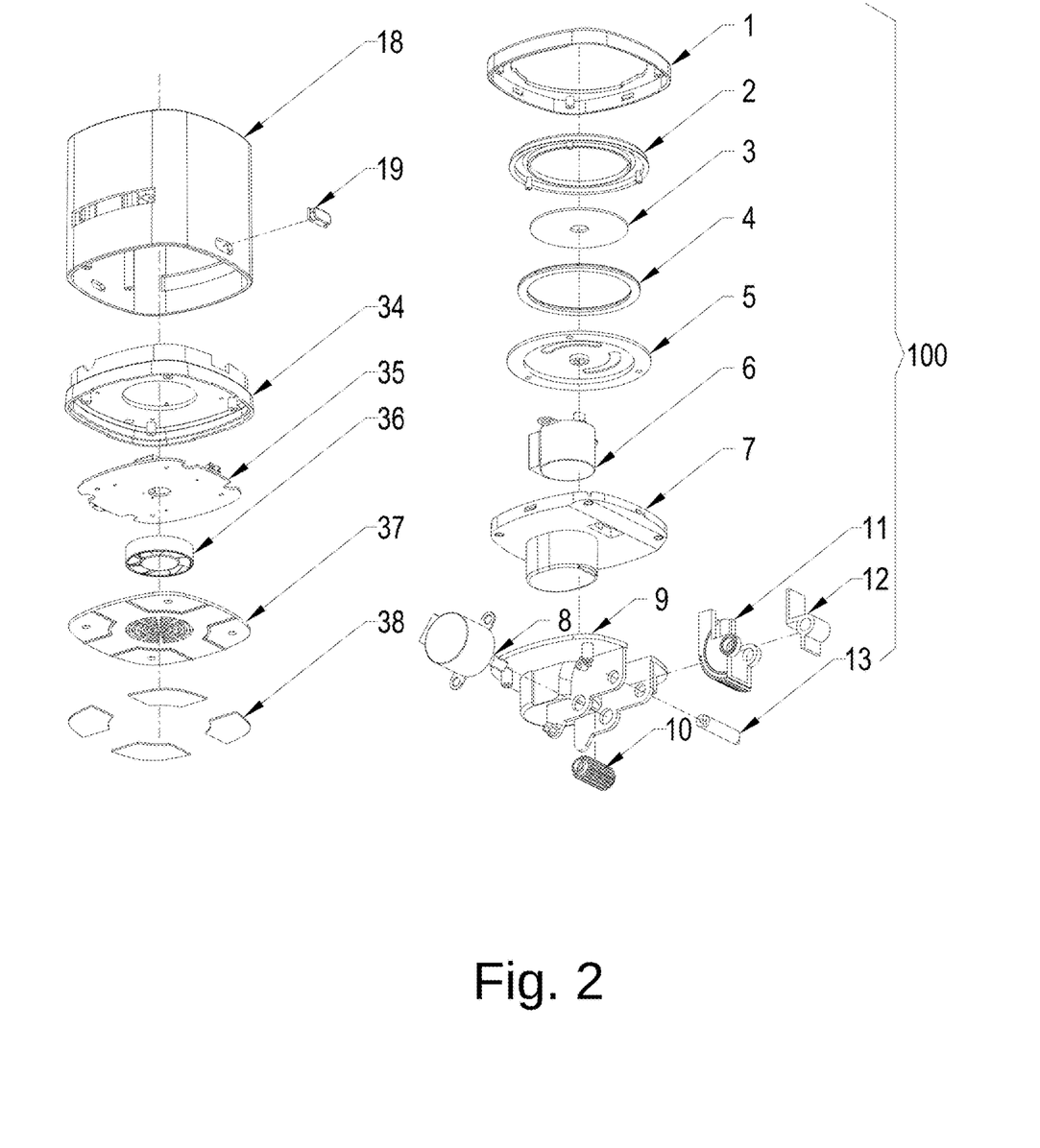
FIG. 2 is the explosive structure diagram of a wireless charging device in the embodiment of the utility model.
Figure 3:
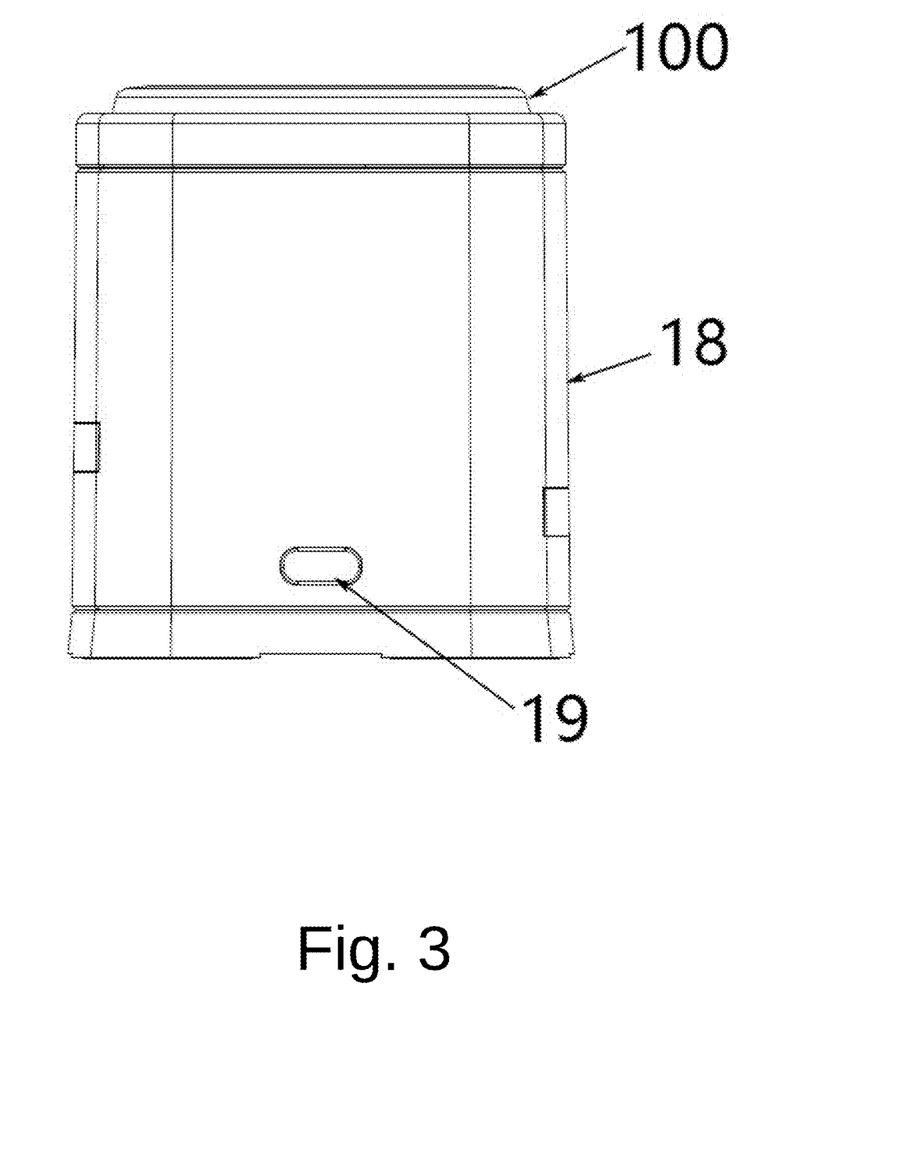
FIG. 3 is the key structure diagram of a wireless charging device in the embodiment of the utility model.
Figure 4:
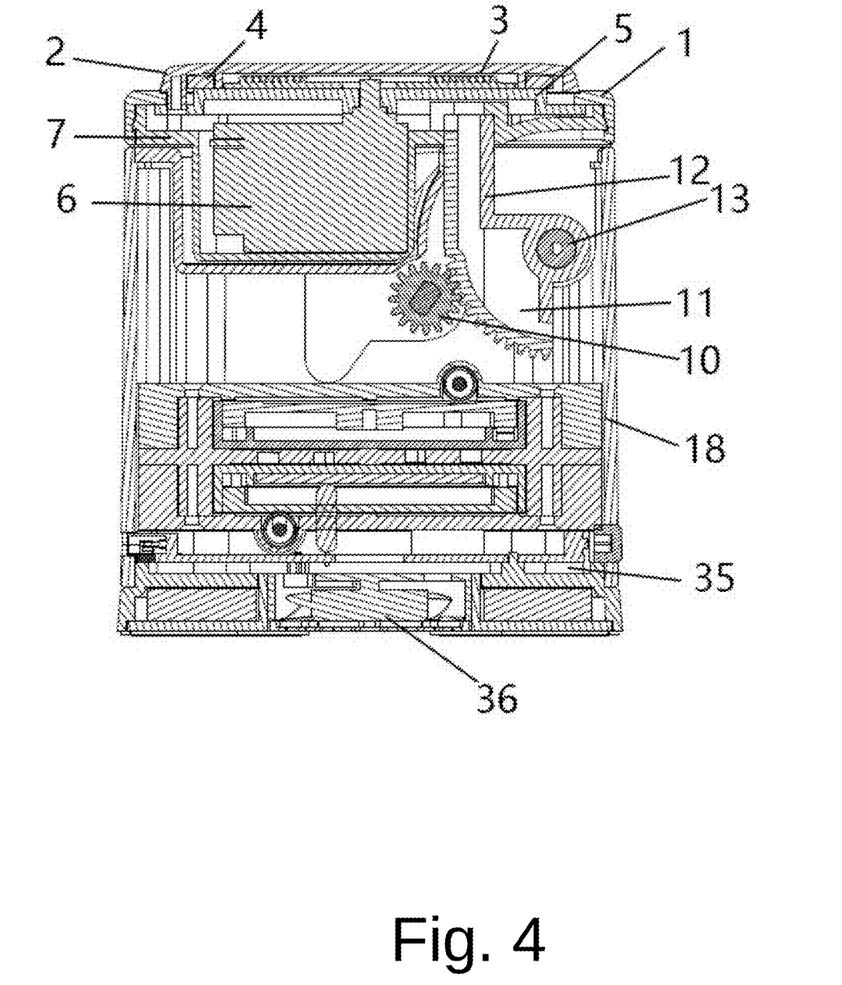
FIG. 4 is the schematic diagram of a profile structure in FIG. 3.

As shown in FIG. 2, a base 34 is also arranged in the main body shell 18, the mainboard 35 is fixed at the bottom of the base, a base guard plate 37 and a cooling fan 36 are arranged under the mainboard 35, the cooling fan is fixed on the mainboard 35, the base guard plate is fixed on the base 34 by screws, and a plurality of anti-slip silicone pads 38 are arranged under the base guard plate 37.

Figure 8:
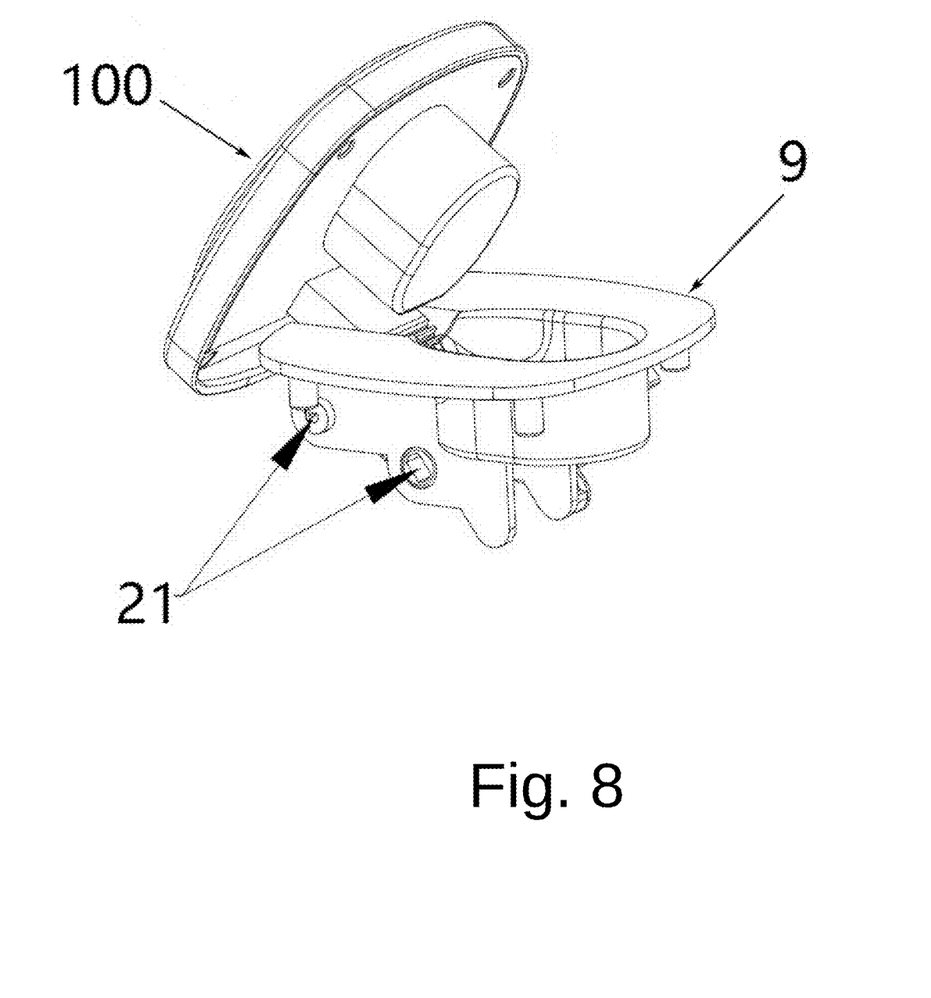
FIG. 8 is the structural diagram of a first wireless charging device in the embodiment of the utility model.
Figure 9:
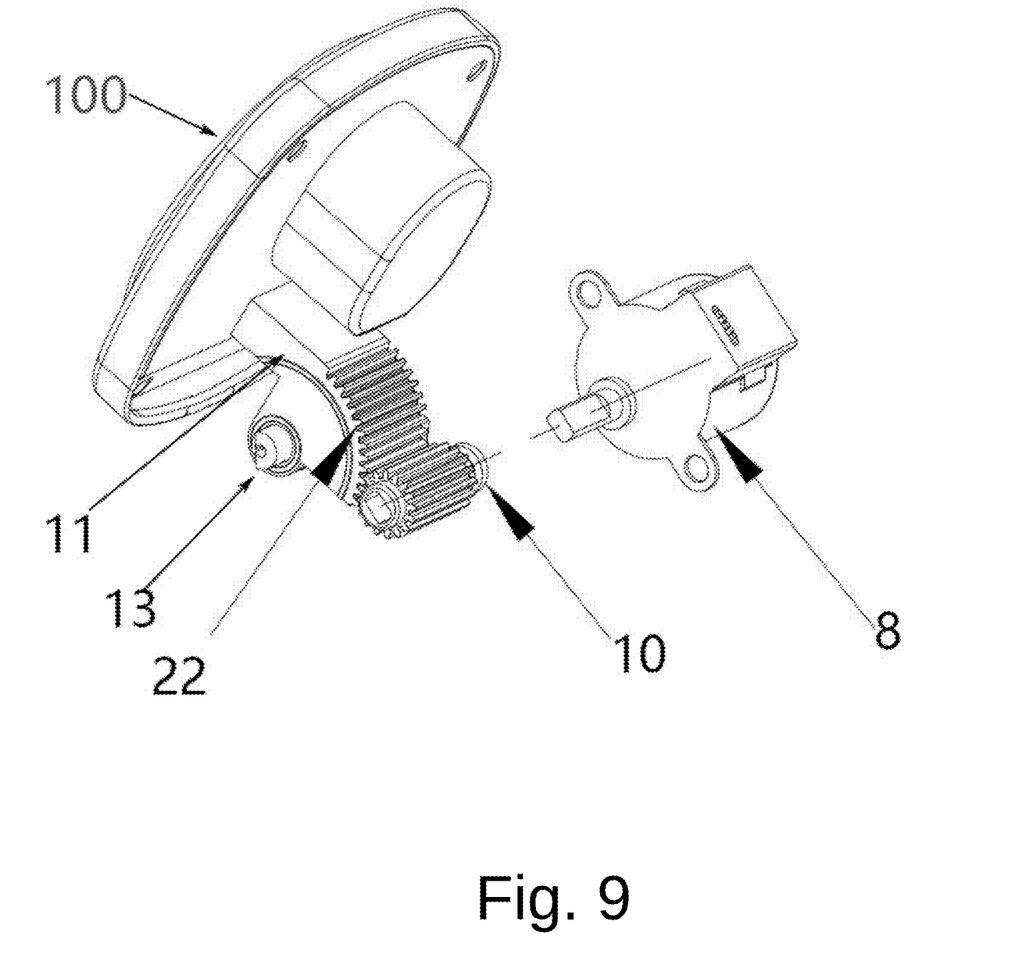
FIG. 9 is the schematic structural diagram for a vertical rotation structure of a first wireless charging device in the embodiment of the utility model.

As shown in FIG. 8 and FIG. 9, a rotating part 11 is arranged at the bottom of the first wireless charging device, a shaft hole at the center of the rotating part is connected with the main body shell through a rotating shaft 13, and a large gear 22 is arranged on the rotating part 11 and is connected with a revolving gear 10 located at the first motor 8 in a transmission mode.

Figure 6:
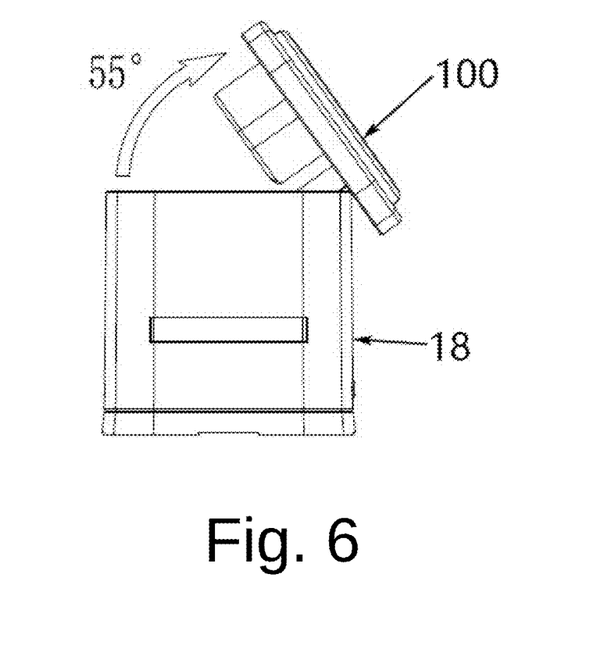
FIG. 6 is the vertical rotation diagram of a wireless charging device in the embodiment of the utility model.

As shown in FIG. 6, the large gear on the rotating part 11 is a sprocket, the length of the gear circumference determines the rotation angle of the rotating part; in the embodiment of the utility model, the rotating part can rotate by 55 degrees, the gear circumference of the large gear can be adjusted as required, and the rotating part 11 rotates at different angles.

A baffle plate 12 connected with the rotating part and used to limit the rotation angle of the rotating part 11 is also provided with a shaft hole for the rotating shaft 13 to pass through; when assembled, the baffle plate 12 is attached to the back of the rotating part 11 and rotates together; one end of the baffle plate 12 is longer than the rotating part 11 and props against the main body shell 18 to stop the rotation of the rotating part 11 when the rotating part 11 rotates to a certain angle.

A support bracket 9 is arranged at the top of the main body shell to fit and support the first wireless charging device; the upper end of the support bracket 9 is used to carry the first wireless charging device, a plurality of shaft holes 21 are arranged at the lower part of the support bracket 9, namely, a first shaft hole, a second shaft hole and a first motor installation position; after the first motor is installed, the rotating shaft of the first motor extends into the first shaft hole to be fixedly connected with a rotating gear 10, the rotating part is connected to the second shaft hole through a pin, and the large gear on the rotating part is connected to the revolving gear 10.

Figure 10:
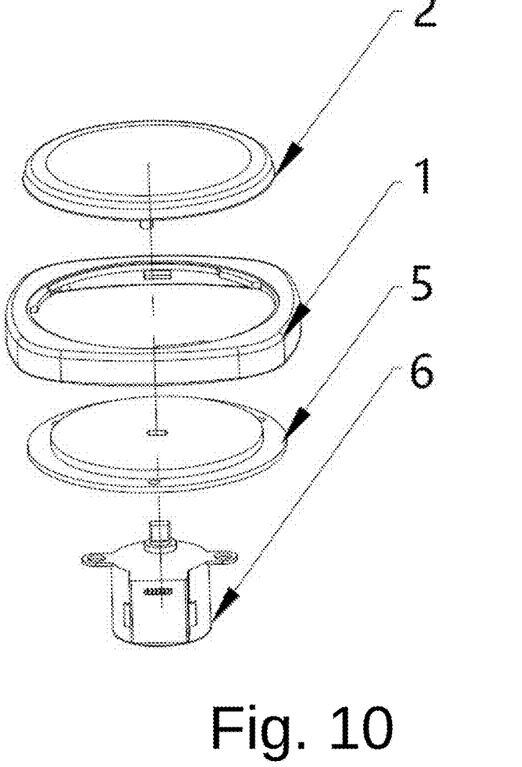
FIG. 10 is the schematic diagram for an explosive structure of a first wireless charging device in the embodiment of the utility model.
Figure 11:
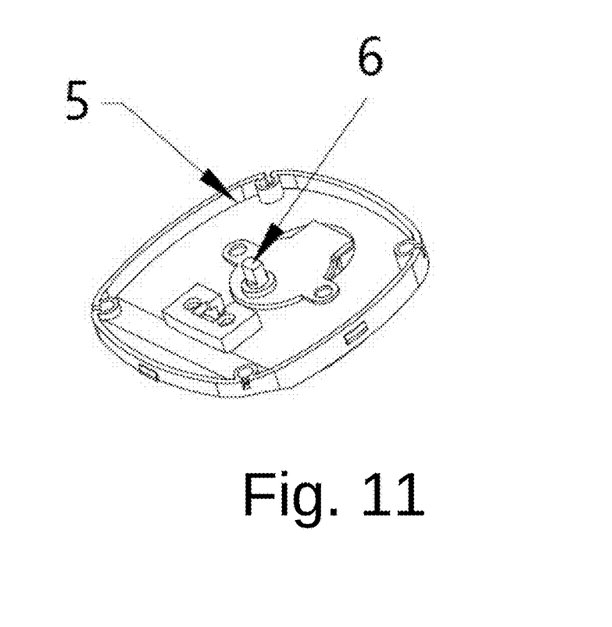
FIG. 11 is the schematic diagram for a lower turntable support structure of a first wireless charging device in the embodiment of the utility model.

As shown in FIG. 10 and FIG. 11, the first wireless charging device comprises a panel 1, on which a panel turntable 2 and a lower turntable support 5 fit with the panel turntable are arranged, the lower turntable support 5 is connected with a second motor 6, and the rotating shaft of the second motor 6 passes through a circular hole in the center of the lower turntable support 5, and the lower turntable support 5 is fixed on the rotating shaft of the second motor 6.

A panel bottom shell 7 is fixed at the lower part of the panel and is provided with a cavity for accommodating and fixing the second motor, and the second motor is fixed in the cavity.

The wireless charging device also comprises a coil 3 and a ring magnet 4, which are arranged in a space enclosed by the lower panel support, the panel and the panel turntable.

Figure 12:
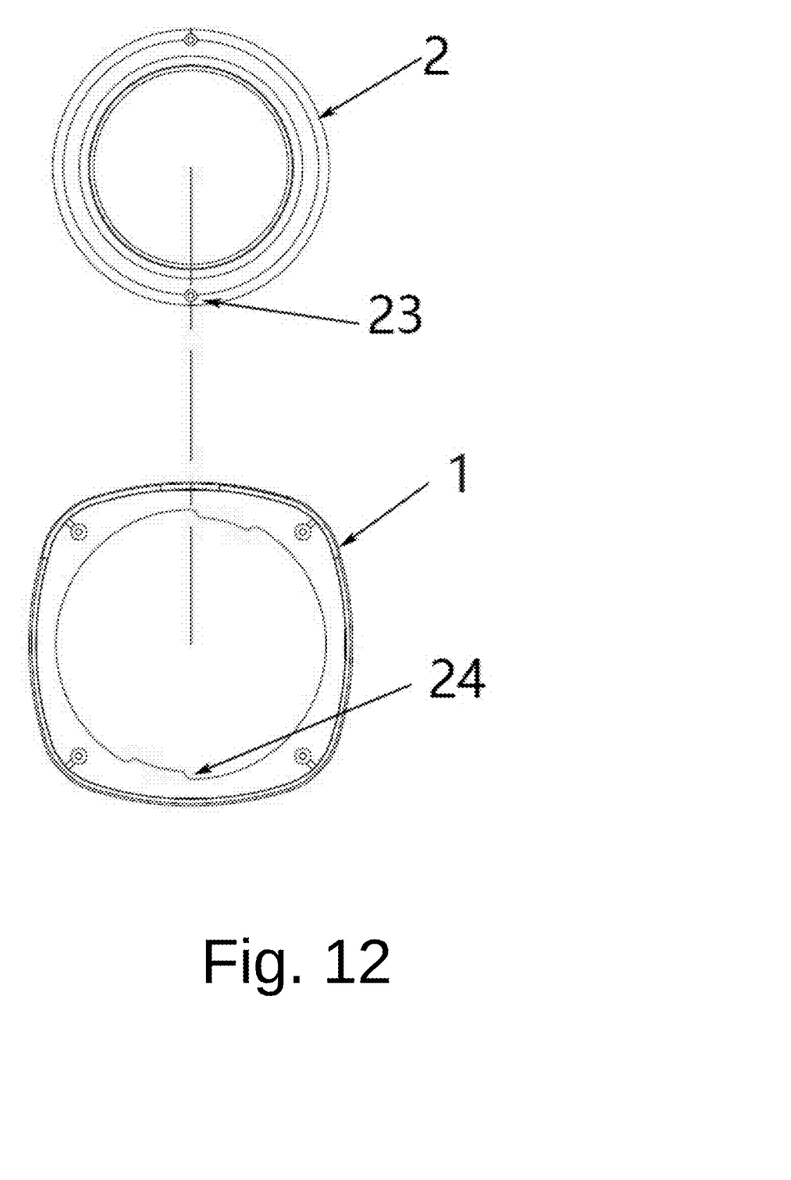
FIG. 12 is the schematic diagram of a panel and panel turntable structure in the first embodiment.
Figure 13:
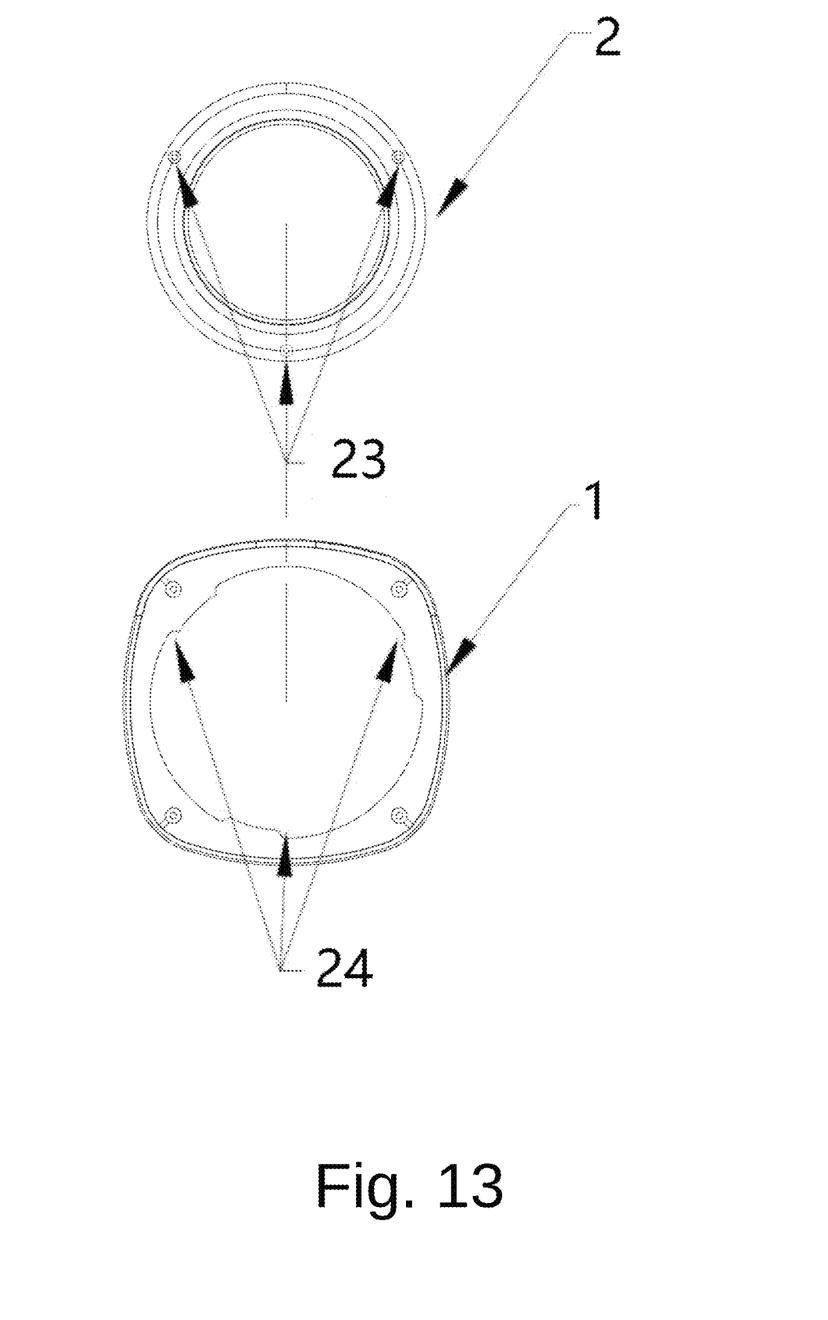
FIG. 13 is the schematic diagram of a panel and panel turntable structure in the second embodiment.

As shown in FIG. 12 and FIG. 13, a plurality of positioning columns are arranged on the panel turntable 2, corresponding limit slots are arranged on the panel, and the positioning columns slide back and forth along the limit slot.

Figure 7:
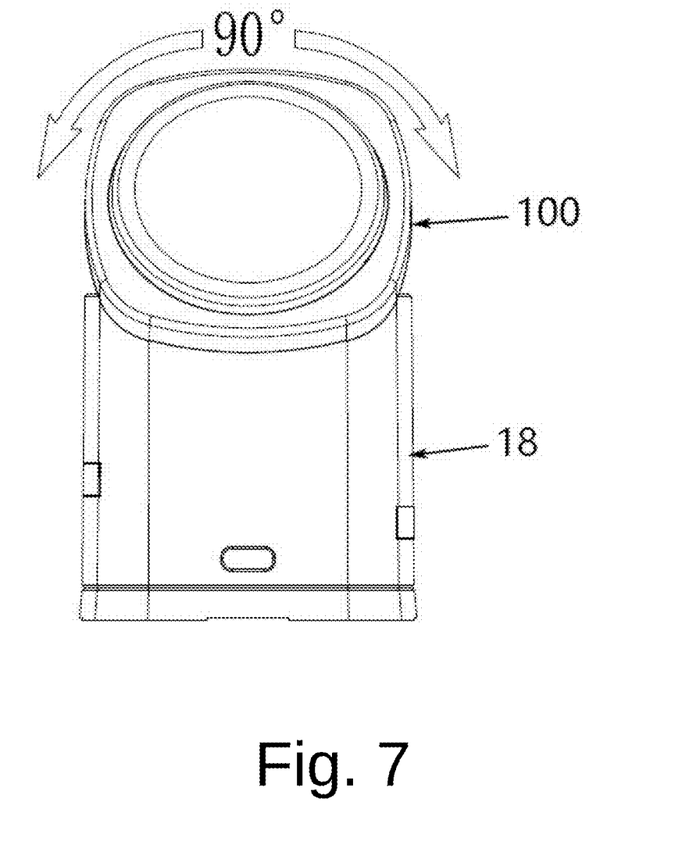
FIG. 7 is the horizontal rotation diagram of a wireless charging device in the embodiment of the utility model.

As shown in FIG. 7 and FIG. 12, the panel can be horizontally rotated by 90 degrees when the positioning columns 23 and the limit slots 24 are distributed at 180 degrees; as shown in FIG. 11 and FIG. 13, the number of positioning columns 23 and limit slots 24 is adjusted so that the panel rotates at different angles.

The number of positioning columns 23 is consistent with the number of limit slots 24, so that each positioning column slides back and forth in the corresponding limit slot.

Figure 14:
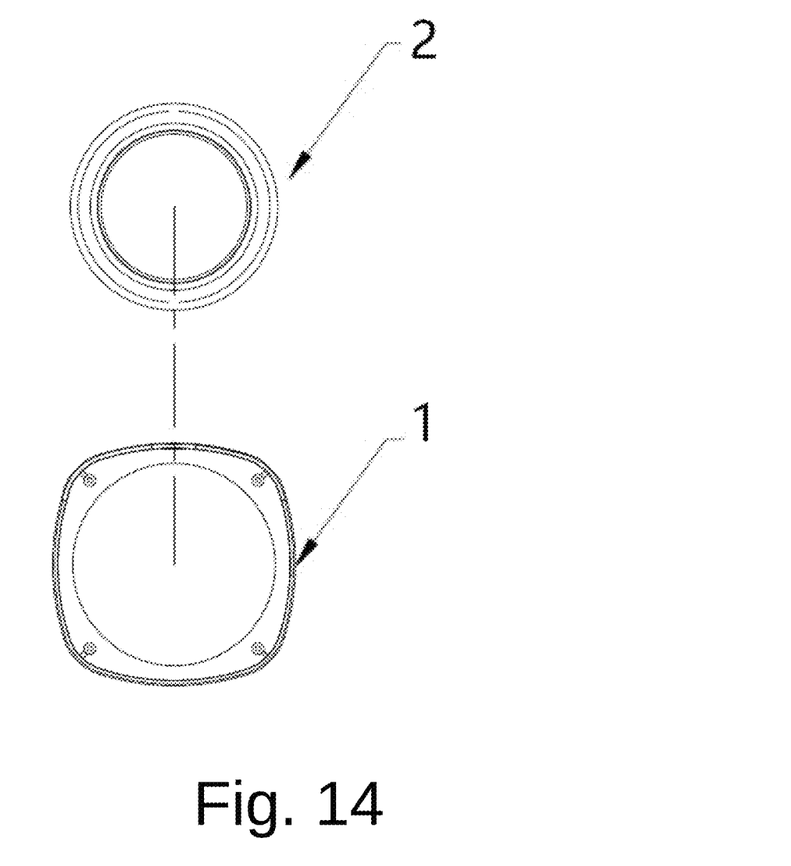
FIG. 14 is the schematic diagram of a panel and panel turntable structure in the third embodiment.

FIG. 14 is an embodiment without positioning columns and limit slots 24, in which the panel can rotate by 360 degrees.

Compared with the prior art, the utility model proposes an angle self-adjusting wireless charging device, which has the following beneficial effects: a control signal generated after power-on is transmitted to the first motor or the second motor to drive the first wireless charging device to rotate vertically or horizontally, or the first motor and the second motor are controlled by buttons to drive the first wireless charging device to rotate vertically or horizontally.

Figure 5:
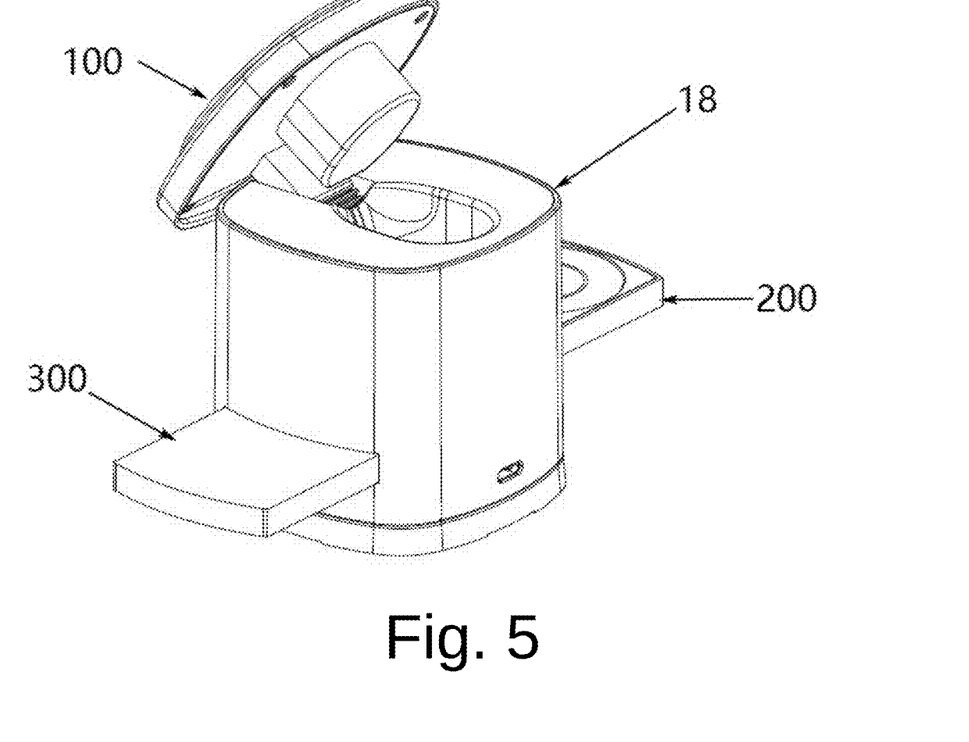
FIG. 5 is the application structure diagram of a wireless charging device in the embodiment of the utility model.

As shown in FIG. 5, a second wireless charging device 200 and a third wireless charging device 300 are also arranged in the embodiment of the utility model, respectively located on both sides of the main body shell 18, staggered vertically and used to charge a Bluetooth headset and a smart watch respectively. As the second wireless charging device and the third charging device are disclosed and described in detail in other patents of the applicant, they are not detailed here.

The above are only preferred embodiments of the utility model, and are not intended to limit the utility model. Ordinary technicians in the field may make various changes and variations to the utility model. Any modification, equivalent substitution, improvement, etc. made within the spirit and principle of the utility model shall fall within the scope of protection of the utility model.

The invention claimed is:

1. A wireless charging device, comprising:
a main body shell;
a mainboard disposed in the main body shell;

first and second motors connected to a mainboard in the main body shell respectively;
a first wireless charging device disposed on a top of the main body shell, the first wireless charging device including a panel, a lower turntable support disposed in the panel, and a panel turntable disposed on the panel and secured to the lower turntable support wherein a rotating shaft of the second motor passes through the lower turntable support and is secured to the lower turntable support so that a rotation of the rotating shaft of the second motor is configured to horizontally rotate the panel turntable;
a plurality of positioning columns disposed on the panel turntable;
a plurality of sets of two limit slots disposed in the panel wherein each of the positioning columns are configured to slide between the limit slots of the same set;
a rotating part disposed at a bottom of the first wireless charging device, the rotating part including a sprocket;
a baffle plate secured to the rotating part;
a rotating shaft passing through the baffle plate and the rotating part so that both the baffle plate and the rotating part are configured to rotate about the rotating shaft; and
a revolving gear operatively connected to the first motor and meshing with the sprocket so that the first motor is configured to vertically rotate both the rotating part and the first wireless charging device.

* * * * *